United States Patent [19]

Lawson et al.

[11] Patent Number: 4,581,488

[45] Date of Patent: Apr. 8, 1986

[54] LAST NUMBER REDIAL DEVICE

[75] Inventors: Robert Lawson; Jimmie R. Augustus; Robert Corless, all of San Jose; John Kardash, Gilroy, all of Calif.

[73] Assignee: Comdial Technology Corporation, Sunnyvale, Calif.

[21] Appl. No.: 698,508

[22] Filed: Feb. 5, 1985

Related U.S. Application Data

[63] Continuation of Ser. No. 513,871, Jul. 14, 1983.

[51] Int. Cl.⁴ .......................................... H04M 1/272
[52] U.S. Cl. .................................................. 179/90 B
[58] Field of Search ........... 179/90 B, 90 BB, 90 BD, 179/90 K, 5 R, 18 B, 84 R

[56] References Cited

U.S. PATENT DOCUMENTS

| 4,143,243 | 3/1979 | Sutton | 179/90 B |
| 4,243,845 | 1/1981 | Feinberg et al. | 179/90 B |
| 4,277,651 | 7/1981 | Fisher et al. | 179/90 B |
| 4,324,954 | 4/1982 | Taylor | 179/90 B |

Primary Examiner—Stafford D. Schreyer
Attorney, Agent, or Firm—Townsend and Townsend

[57] ABSTRACT

A last number redial device which provides a valid dialing sequence/access code test, before the contents of a last number redial register are disturbed, is described. A first and a second register are alternately loaded with a first, threshold portion (N) of a telephone number (N+M) during a dialing sequence. The number of digits entered are counted. If the count is greater than a threshold amount (N+1), a toggle signal is produced indicating a valid number has been entered. A second, terminal portion of the telephone number produced during the dialing sequence is thereafter loaded to a third register. In this way, the entire number is loaded in the selected first or second register and the third register. If a last number redial sequence is initiated, the selected one of the first or second registers and the third register provide an output to the telephone line of the last dialed number. If a next dialing sequence is initiated, the other of the first or second registers is initially loaded with the threshold portion of the telephone number. If an invalid number or access code is detected, the contents of the registers storing the last number dialed are saved. If a valid number is detected, the terminal portion of the presently dialed number is stored in the third register and the presently selected one of the first and second registers and the third register become the last number redial register.

4 Claims, 2 Drawing Figures

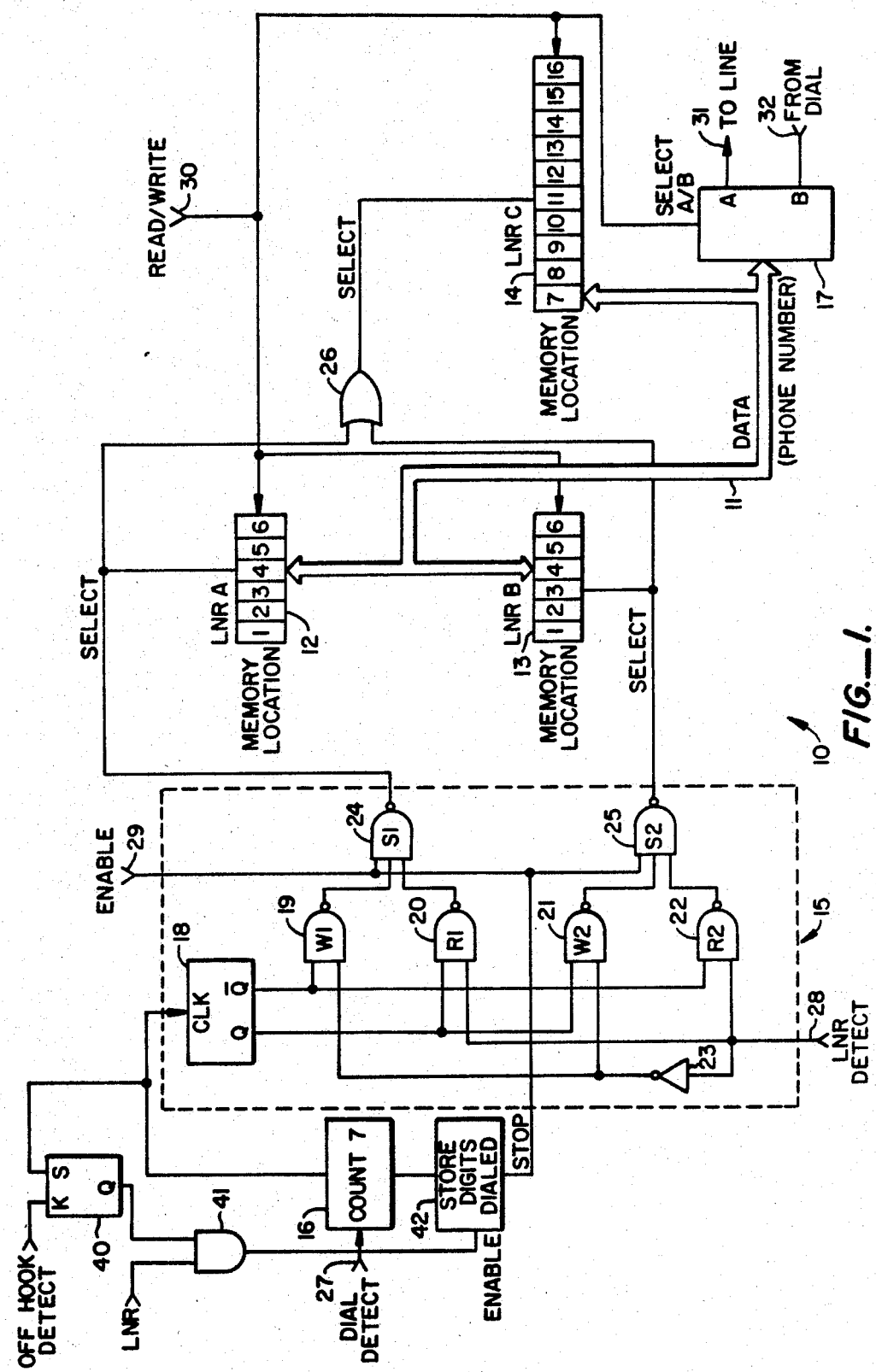
FIG.—1.

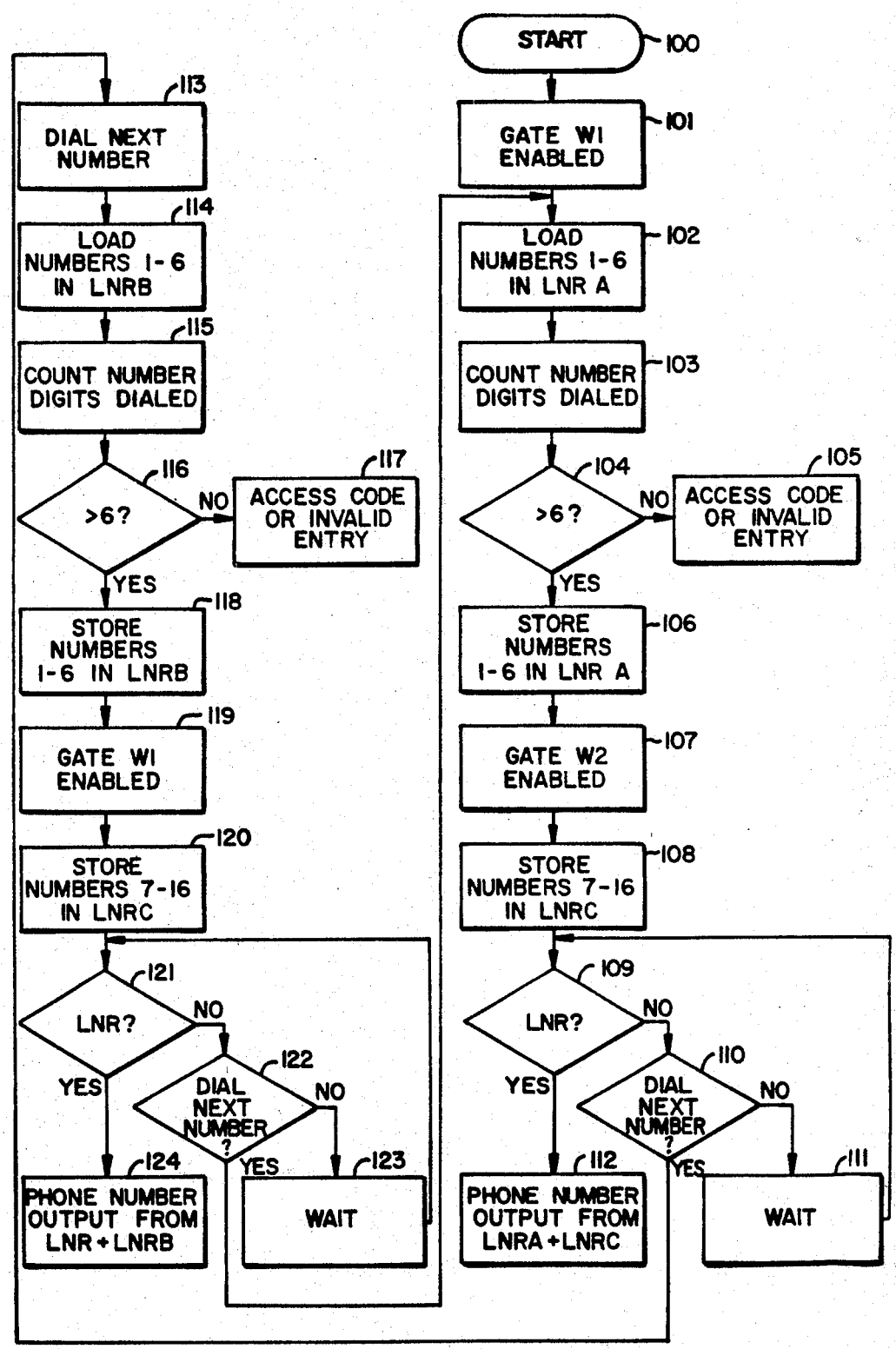
FIG._2.

LAST NUMBER REDIAL DEVICE

This is a continuation of Ser. No. 513,871 filed July 14, 1983.

BACKGROUND OF THE INVENTION

1. Field of the Invention

The present invention relates to telephone dialing circuits. More particularly, the present invention relates to a last number redial validation device for telephone dialing circuits.

2. Description of the Prior Art

Last number redial is a commonly available feature on many of the telephone sets now available to consumers and businesses. Prior art last number redial circuits provide a memory register for storing a last dialed telephone number. If the line of the party called is busy or there is no answer, the number may be redialed by pressing a last number redial key or pushbutton on the telephone set. Such features eliminate the need to redial the entire telephone number. Any other telephone numbers subsequently dialed are stored in the last number redial memory register, thereby replacing previously stored telephone numbers.

A problem with prior art last number redial circuits is that the contents of the last number redial memory register are disturbed by any subsequent telephone dialing. If a telephone number stored in the last number redial memory register requires the dialing of an access code or any other signalling code, that telephone number or portions of that telephone number are modified from the last number redial memory register by such codes.

SUMMARY OF THE INVENTION

The present invention provides a telephone last number redial device whereby each input dialing sequence is tested to determine if a valid telephone number is being dialed or if an access code or other such code is being dialed. If a valid telephone number is being dialed, a last number redial register is loaded which may later be accessed during a last number redial sequence. If an access code or other such code is dialed during a telephone number dialing sequence, the contents of the last number redial register remain intact. In this way, an access code or invalid entry does not disturb the contents of the last number redial register.

During a last number redial sequence, when output of an access code is desired (e.g., to seize a line in a PBX or PABX environment), the access code may be keyed in (or may be recalled from a repertory storage) and the last number redial register key may be actuated to recall the contents of the last number redial register for dialing output to the telephone line. Subsequent dialing of a valid telephone number reloads the last number redial register with that valid number, which may then be accessed as desired by initiating the last number redial sequence.

The present invention includes a first register which is operable to selectably store a first, threshold portion (N) of a telephone number (N+M), which is produced during the telephone dialing sequence. A second, similar register is also operable to alternately store said first, threshold portion of the telephone number. During actual dialing, one of the first and second registers contains the first portion of the previously stored last number redial register. The other of the first and second registers is selected to store numbers generated during the current dialing sequence.

A third register is included for storing a second, terminal portion (M) of the telephone number. A select circuit alternately couples a selected one of said first register and said second register to the third register. If a valid phone number is detected, then the first, threshold portion of the telephone number is saved in the register that is storing numbers during the dialing sequence. Detection of a valid number also couples said selected one of said first and second registers to said third register, such that the first threshold portion of the telephone number is concatenated with a second terminal portion of the telephone number, which is stored in the third register.

Valid telephone number detection is accomplished by means of a counter which is operable to produce a toggle signal in response to a threshold count (N+1) during the telephone dialing sequence. If a threshold count is detected, then the toggle signal is coupled to the select circuit which, in turn, couples the selected one of the first and second registers to the third register. Continued entry of numbers during the telephone dialing sequence loads the third register with the terminal portion of the telephone number. In this way, an entire dialing sequence is stored in the two registers (the selected one of first and second registers and the third register).

Appropriate controls are provided for selecting a read or write condition. Accordingly, a dialing sequence may be tested for entry of a valid telephone number and loaded (if a valid phone number) into the last number redial register. Alternately, the contents of the last number redial register may be read therefrom onto a telephone line for dialing purposes. The prior last number redial register contents are preserved if the current entry is invalid.

BRIEF DESCRIPTION OF THE FIGURES

FIG. 1 is a block schematic diagram of a last number redial device according to the present invention; and FIG. 2 is a flow diagram of a last number redialing process according to the present invention.

DETAILED DESCRIPTION OF A PREFERRED EMBODIMENT

The present invention provides a last number redial device of the type that loads a last number redial register when a valid telephone number dialing sequence is detected. The contents of the last number redial register remain undisturbed in the event an access code or invalid dialing entry is detected. A valid dialing sequence is defined to be that which operates standard telephone company switching equipment; in this embodiment of the invention—seven digits.

Referring to FIG. 1, a last number redial device 10 is shown in block schematic form. A data bus 11 couples data representing a telephone number to be stored to or to be accessed from three registers, LNRA 12, LNRB 13, and LNRC 14. Registers 12-14 comprise the last number redial register memory.

A select circuit 15 determines which of either registers LNRA or LNRB is to be active during a particular dialing sequence or last number redial sequence. A first select line is coupled to register LNRA and, when energized, couples register LNRA to data bus 11. A second select line is coupled to register LNRB and, when energized, couples register LNRB to data bus 11. Select circuit 15 operates in such manner that only one of registers LNRA or LNRB may be selected at a given time. Both select lines are coupled through OR gate 26 to select register LNRC during any valid dialing sequence.

Data bus 11 interfaces to telephone set dialing circuitry at terminal 32 and to the telephone line through terminal 31. A read/write input 30 provides a select signal to buffer 17 to couple, as selected, data bus 11 to the dialing circuitry or to the telephone line. When a number is being dialed during a telephone number dialing sequence, the dialing circuitry is coupled through buffer 17, via data bus 11, to register LNRA 12 or LNRB 13 and to register LNRC 14.

A write line is provided to the selected registers and may be set such that the dialing sequence is stored in the registers, as during a dialing sequence. In a read mode, buffer 17 couples data bus 11 to the telephone line. An LNR detect signal is provided at terminal 28 to actuate select circuit 15. In this way, the contents of the selected one of register LNRA or LNRB and of register LNRC are output to the telephone line, as during a last number redial sequence.

A unique feature of the present invention is its ability to detect a valid telephone number. This feature is particularly useful in a PBX, PABX, or access code dialing environment. By providing such valid telephone number entry detection, the contents of the last number redial registers are not disturbed during an access code or other such dialing sequence. If it is necessary to enter such an access code before actuating the last number redial circuit, the dialing party can be assured that such access code entry does not alter the contents of the last number redial register. Thus, the access code may be dialed and, when a dial tone is returned indicating line seizure, the last number redial register may be accessed for output over the telephone lines.

Valid number detection is performed by counter 16. Each digit detected during a dialing sequence is presented via terminal 27 to counter 16. Because a standard telephone dialing sequence requires the entry of seven digits, access codes and the like may contain up to six digits. For purposes of this embodiment in the invention, counter 16 produces a toggle signal on detecting entry of seven digits during the dialing sequence. The output of counter 16 accordingly operates select circuit 15 to produce an appropriate register LNRA or LNRB select signal. The toggle signal always sets select circuit 15 to choose the other of the LNRA and LNRB registers. If register LNRA was chosen by the last select signal, register LNRB is chosen by the next select signal and so on.

A register 42 is included to keep track of the digits dialed. The register is enabled during a last number redial/off-hook condition as logically sensed by AND gate 41 and off-hook detect circuit 40. Register 42 is also coupled to counter 16 to hold the counter's contents so that at redial only the number being transmitted over the line is output. Any last number redial register space in excess of the current valid number is not output as a result of a stop or inhibit signal produced by register 42.

Select circuit 15 includes a flip-flop 18, having a clock input which receives the output of counter 16. Upon receipt of that signal, the output of flip-flop 18 toggles. Each output of flip-flop 18 (Q and $\overline{Q}$) is coupled to a write NAND gate and a read NAND gate, the outputs of which are coupled to select NAND gates. The true output (Q) of flip-flop 18 is coupled to NAND gates 20 (R1) and 21 (W2), respectively the read NAND gate for select NAND gate 24 (S1) and the write NAND gate for select NAND gate 25 (S2). In a like manner, the complement output of flip-flop 18 ($\overline{Q}$) is coupled to write NAND gate 19 (W1) and read NAND gate 22 (R2), respectively, the write NAND gate for select NAND gate 24 (S1) and the read NAND gate for select NAND gate 25 (S2).

An LNR detect terminal 28 provides read/write selection: read selection as coupled to read NAND gates 20/22 and write selection via inverter 23 to write NAND gates 19/21. During a last number redial sequence, read gates 20 and 22 are enabled; during a dialing sequence, write gates 19 and 21 are enabled. Although a separate LNR detect line and read/write line are shown in this embodiment of the invention, it is possble in other embodiments of the invention to use the same control line to detect both a dialing sequence and a last number redial access sequence.

An enable line is coupled from terminal 29 to NAND gates 24 and 25, the select NAND gates. In the absence of an enable signal, a dialing sequence does not disturb the contents of the last number redial register memory. Such a feature is useful if the contents of the last number redial register are to be frozen or if there are timing intervals that must elapse before further access to the last number redial register is possible.

The following truth table indicates the various states of the devices shown comprising select circuit 15. It can be seen from the table that, based on the true and complement outputs (Q and $\overline{Q}$) of flip-flop 18, either one or the other of registers LNRA and LNRB are selected at any given time. Flip-flop 18 is configured to operate such that each consecutive toggle signal produced by counter 16 changes the state output of the flip-flop. Thus, each consecutive valid dialing sequence, alternately selects one or the other of registers LNRA or LNRB.

| | TRUTH TABLE | | | | | | | |
|---|---|---|---|---|---|---|---|---|
| LNR Detect | Q | $\overline{Q}$ | W1 | R1 | W2 | R2 | S1 | S2 |
| 1 | 0 | 1 | 1 | 0 | 1 | 1 | 1 | 0 |
| 0 | 0 | 1 | 0 | 1 | 1 | 1 | 1 | 0 |
| 1 | 1 | 0 | 1 | 1 | 1 | 0 | 0 | 1 |
| 0 | 1 | 0 | 1 | 1 | 0 | 1 | 0 | 1 |

In operation, one of registers LNRA or LNRB contains a first, threshold portion of a telephone number dialing sequence. The second, terminal portion of the dialing sequence, is located in register LNRC. For purposes of example, assume that registers LNRA and LNRC contain the last telephone number dialed. If a last number redial sequence is initiated, the outputs of registers LNRA and LNRC are concatenated and provided via buffer 17 as an output to the telephone line. A last number redial sequence may be initiated by pressing a designated key-pad push button or by other such means.

In the example, if a new telephone number is being dialed, the dialing information is coupled through buffer 17 and over bus 11 to register LNRB. The contents of register LNRA are saved at this point. Counter 16 counts to detect a valid telephone number entry. If the count indicates an access code or an invalid entry (less than seven numbers in this example), registers LNRA and LNRC remain undisturbed and in control of the bus in the event a last number redial sequence is initiated.

If a valid telephone number sequence is detected by counter 16, the toggle signal thereby produced is coupled to flip-flop 18, which causes a select signal to be output over one of the select lines controlled by NAND gate 24 and NAND gate 25. The select lines toggle in accordance with the states shown in the truth table above. Both select lines are coupled to OR gate 26 to select register LNRC, which is loaded with the remaining numbers in the dialing sequence. In this way, the terminal portion of a valid telephone number is always stored in register LNRC.

In the present example, up to sixteen digits total may be entered into the last number redial register. A valid telephone number takes the form of M+N, where N is the threshold portion of the telephone number, stored in either register LNRA or LNRB, and where M is the terminal portion of the telephone number, stored in register LNRC. A threshold count, indicating a valid number, is therefore defined as N+1.

The valid, just entered telephone number is now the contents of the last number redial register. The terminal portion of previously stored telephone number stored in register LNRC is written over by the terminal portion of the new telephone number. The threshold portion of the previous telephone number still remains in register LNRA. During the next dialing sequence, the next telephone number is written into register LNRA over the previous register contents. If the next dialing sequence is a valid telephone number, the process repeats as above and registers LNRA and LNRC then become the last number redial register. Otherwise, the contents of register LNRB and LNRC remain the last number redial register.

In FIG. 2, a flow diagram of a typical sequence of operation of the present invention is shown. At a start condition (100) registers LNRB and LNRC comprise the last number redial register. As a dialing sequence begins, gate W1 is enabled (101) and the numbers dialed are stored in register LNRA (102). Counter 16 counts the number of digits entered into register LNRA (103). If six or less digits are entered (104), then an access code or invalid entry is detected (105). If greater than six digits are detected (104), then the digits loaded into register LNRA are stored (106); gate W2 is thereafter enabled by the output of flip-flop 18 (107).

The next digits (digits 7-16) comprising the telephone number are stored in register LNRC (108). If a last number redial sequence is detected (109) the telephone number stored in register LNRA and LNRC is coupled to the telephone line (112). If a last number redial sequence is not detected (109), then the device waits for a dialing sequence (110). If a dialing sequence is not detected, then the device waits for the next last number redial sequence or the next dialing sequence (111). If a next dialing sequence is detected (112), then the next telephone number is being dialed (113).

The first six digits of the next dialed telephone number are loaded into register LNRB (114). Counter 16 counts the number of digits produced during the next number dialing sequence (115). If the number of digits counted is six or fewer (116), an access code or an invalid entry is detected (117). If greater than six digits are detected during the dialing sequence, then the first six digits are stored in register LNRB (118) and gate W1 is enabled (119).

The next digits dialed (digits 7-16) are stored in register LNRC (120). If a last number redial sequence is thereafter initiated (121), the contents of registers LNRB and LNRC are output to the telephone line (124). If a last number redial sequence is not detected, the device detects a next dial sequence (122).

If a next dial sequence is not detected, the device waits for the next last number redial sequence or the next dial sequence (123). If a next dial sequence is detected, then the first six digits of the next telephone number are loaded into register LNRA (102) and the sequence repeats.

The foregoing was given for illustration and example, and should not be construed as limiting the invention. Rather, the present invention, as described, is subject to use and manufacture in various embodiments. For example, the invention may be produced for use with either a pulse dialing or dual-tone multi-frequency (DTMF) format. Therefore, the scope of the invention should be limited only by the claims.

We claim:

1. A telephone last number redial device comprising:
   means for temporarily storing a plurality of dialed digits during a telephone dialing sequence;
   a counter, operable to produce a toggle signal in response to a threshold count during a telephone dialing sequence, said count being indicative of a phone number entry;
   means, response to said toggle signal, for retaining said digits representing a telephone number after said dialing sequence; and
   means for accessing said telephone number during a last number redial sequence.

2. The device of claim 1 wherein said temporary storing means comprises a selected first one of at least two registers and said retaining means comprises means for selecting another of said registers to receive digits during a next dialing sequence, thereby preserving said dialed digits in said first register.

3. The device of claim 1 wherein said first register is operable to store a first threshold portion of a telephone number, and further comprising:
   a second register operable to alternately store said first, threshold portion of said telephone number; and
   a third register for storing a second terminal portion of said telephone number.

4. A method for storing and accessing a last dialed telephone number comprising:
   storing a plurality of dialed digits temporarily during a telephone dialing sequence;
   counting said dialed digits during said dialing sequence up to a threshold digit count indicative of said digits being a telephone number;
   producing a toggle signal in response to said threshold digit count;
   retaining said telephone number after said dialing sequence in response to said toggle signal; and
   accessing said retained telephone number during a last number redial sequence.

* * * * *